United States Patent [19]

Mizutani

[11] Patent Number: 4,650,980
[45] Date of Patent: Mar. 17, 1987

[54] INDIVIDUAL DISCRIMINATION CARD

[75] Inventor: Hiroyuki Mizutani, Yokohama, Japan

[73] Assignee: Kabushiki Kaisha Toshiba, Kawasaki, Japan

[21] Appl. No.: 714,498

[22] Filed: Mar. 21, 1985

[30] Foreign Application Priority Data

Apr. 2, 1984 [JP] Japan .................................. 59-63419

[51] Int. Cl.⁴ .............................................. G06K 5/00
[52] U.S. Cl. ...................................... 235/380; 235/381
[58] Field of Search .................................. 235/380, 381

[56] References Cited

U.S. PATENT DOCUMENTS 4,549,663 6/1986 Nagata .............................. 235/380

FOREIGN PATENT DOCUMENTS 52-7649 1/1977 Japan.
57-29498 2/1982 Japan.

Primary Examiner—Harold I. Pitts
Attorney, Agent, or Firm—Schwartz, Jeffery, Schwaab, Mack, Blumenthal & Evans

[57] ABSTRACT

An individual discrimination card in accordance with the present invention includes a memory for memorizing the data which represents the frequency of erroneous input of a secret code data. The erroneous input frequency data comprises a first data and a second data. The individual discrimination card judges whether or not a secret code data is an erroneous input, and includes as well a microprocessor which lets the memory unit to memorize the first data when the secret code data is an erroneous input, while lets the first data in the memory unit to be rewritten to the second data when the secret code data is a legitimate one.

19 Claims, 6 Drawing Figures

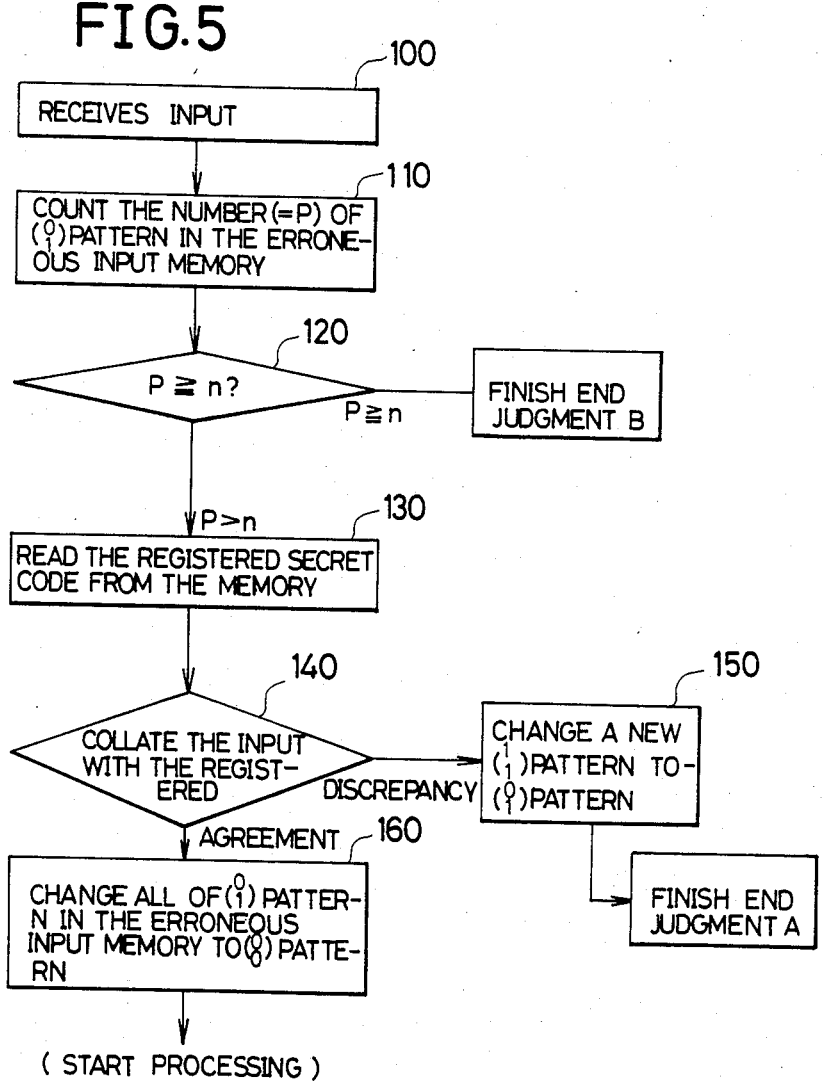

INDIVIDUAL DISCRIMINATION CARD

BACKGROUND OF THE INVENTION

1. Field of the Invention

The present invention relates to a discrimination card carried on person, for confirming the bearer by means of a secret code assigned to the bearer, which includes a memory for memorizing the erroneous input operation of the secret code and is constructed so as to render the card useless if erroneous inputs take place for a prescribed number of times in a row.

2. Description of the Prior Art

In a prior art discrimination card with built-in CPU and memory which is used for banking and other purposes, there is known a method of rendering the card useless by detecting the erroneous input operations for a prescribed number of times by a card reader/writer, in order to prevent illicit uses of the card. The method described above is disclosed in Japanese Patent No. 828847.

Furthermore, a method of permanently holding the traces of the erroneous input operations in the memory of the card to render the card useless on its own, when the cumulative frequency of erroneous inputs exceeds a prescribed number, is disclosed in Japanese Patent Publication for opposition No. 52-7649. However, in the above method, the card will become useless automatically when the cumulative frequency of erroneous inputs exceeds a prescribed number, even when the erroneous inputs took place due to careless operation, so that it has a defect in that it cannot discriminate whether an erroneous input was made carelessly or on purpose of illicit use.

To solve the above defect, there is disclosed in Japanese Patent Publication No. 57-29498 a card with a system by which the processing apparatus in the card detects the frequency of successive erroneous inputs by specially arranging for memorizing a successful operation subsequent to an erroneous input operation, to judge whether the number of successive erroneous inputs is less than a prescribed member.

However, the above system has a defect in that it requires a special memory for memorizing a successful operation subsequent to an erroneous input operation.

SUMMARY OF THE INVENTION

An object of the present invention is to provide an individual discrimination card which is capable of detecting an illicit use by means of a smaller number of memories.

Another object of the present invention is to provide an individual discrimination card which is capable of memorizing the cumulative freqency of erroneous inputs and the frequency of successive erroneous inputs up to the present time, by means of a smaller number of memories.

Another object of the present invention is to provide an individual discrimination card which does not require a special memory for memorizing a successful operation subsequent to an erronous input operation.

Briefly descirbed, these and other objects of the present invention are accomplished by the provision of an improved individual discrimination card with built-in CPU and memory which includes the memory means for memorizing the data which represents the frequency of erroneous inputs of the secret code data. The data on the frequency of erroneous inputs consist of a first data and a second data, and further, the individual discrimination card includes a judging means to judge whether or not the secret code data is an erroneous input, as well as to let the memory unit to memorize the first data; when the secret data is an erroneous unit and to let the first data in the memory unit to be rewritten to a second data when the secret code data is a legitimate data.

BRIEF DESCRIPTION OF THE DRAWING

These and other objects, features and advantages of the present invention will be more apparent from the following description of a preferred embodiment, taken in conjunction with the accompanying drawings, in which:

FIG. 2b is a simplyfied diagram for illustrating the construction of the memory unit of the card shown in FIG. 2a;

FIG. 4 is a diagram showing an example of the memory state of an erroneously input data in a card embodying the present invention; and FIG. 5 is a flow chart illustrating the flow of the processings in a card embodying the present invention.

DESCRIPTION OF THE PREFERRED EMBODIMENTS

Figure 1:
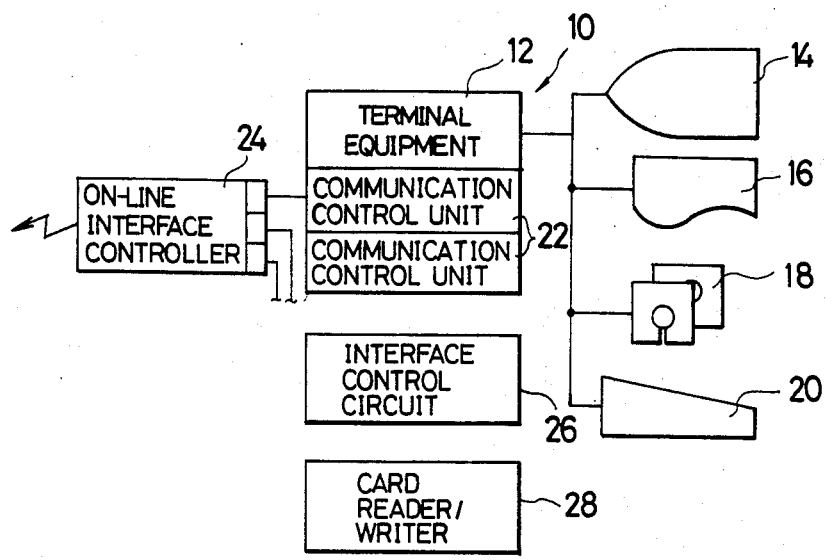
FIG. 1 is a block diagram of a terminal equipment for utilizing an individual discrimination card in accordance with the present invention.

Referring to FIG. 1, there is shown with a reference numeral 10 a terminal equipment 12 in which an individual discrimination card embodying the present inventon is inserted. The terminal equipment 12 includes 16-bit micro-computers, a color display 14, a printer 16, a floppy disk unit 18, and a keyboard 20. The main body of the terminal equipment 12 is equipped further with a 2-channel communication control unit 22, where one channel is connected via an on-line interface controller 24 to the communication circuit, while the other is connected via an interface control circuit 26 to a card reader/writer 28. Upon inputting necessary secret code data through the keyboard 20, after a user inserted his card into the card reader/writer 28, the terminal equipment 12 is connected through the on-line interface controller 24 and the communication circuit to an on-line system of a bank or the like, enabling the user to exchange desired information.

Figure 2A:
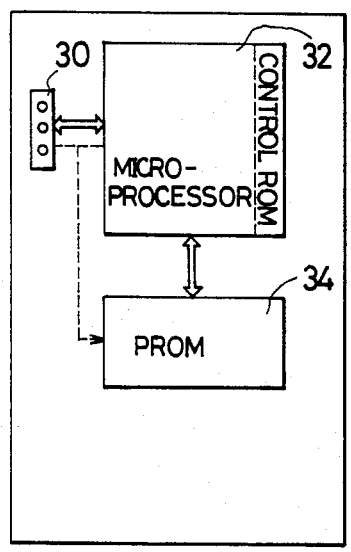
FIG. 2a is a simplified diagram for illustrating the internal structure of a card embodying the present invention.

FIG. 2a shows a card embodying the present invention to be inserted to the reader/writer 28. The card includes a connection unit 30 for receiving transmitting signals from to the card reader/writer 28, a microprocessor 32 which has a built-in control program, and a memory unit 34 consisting, for example, of an 8k byte PROM or EPROM. The main functions of the microprocessor 32 are the collation of the secret code data and the control on the recording of the data on the erroneous inputs in the memory unit 34.

Figure 2B:
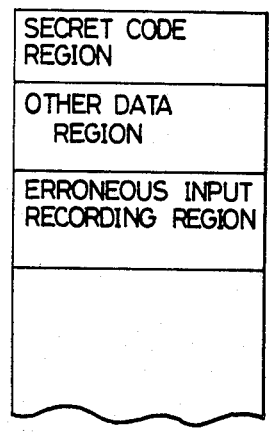

FIG. 2b is for illustrating the memory content of the memory unit 34 which includes a secret code region for memorizing the secret code data proper to the user, a region for other data for memorizing data necessary for information exchange with other host systems, and an erroneous input recording region for memorizing the information regarding the erroneous inputtings of the secret code data that have been done so far to the card.

Figure 3:
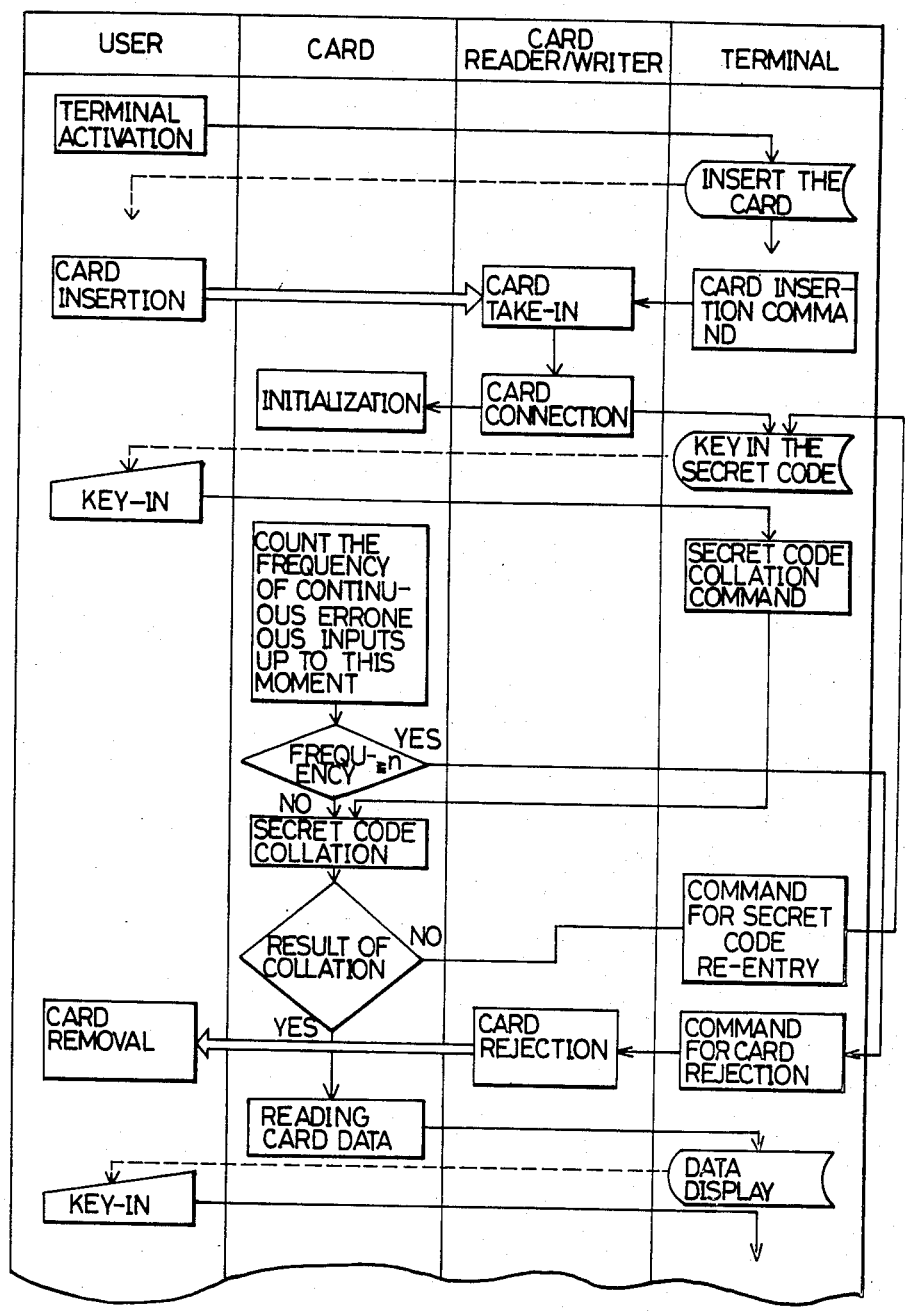
FIG. 3 is a flow chart for illustrating the usage of a card embodying the present invention.

A brief description of the usage of such a system will now be given by referring to FIG. 3. First, when the terminal equipment 10 is activated by a user, a message "Insert the card" will be displayed on the display 14. When the user inserts, upon seeing this message, a card as shown by FIG. 2a into the card reader/writer 28, the reader/writer 28 takes in the card to the inside, supplies the card with a power via the connection unit 30, and enables the transmission and reception of the necessary data. At that time the microprocessor 32 in the card is initialized. When the connection of the card with the reader/writer 28 is completed, the terminal equipment displays a message "Key in the secret code" on the display 14. With this, the user inputs his secret code data through the keyboard 20. Upon completion of inputting of the secret code data, the terminal equipment 10 supplies, together with a secret code collation command, the input secret code data to the microprocessor 32. According to the collation program built in the control ROM, the microprocessor 32 collates the secret code data which has been memorized in advance in the secret code region of the memory unit 34 with the secret code data supplied by the input through the keyboard 20. If the input was judged erroneous, the result of the collation is forwarded to the terminal equipment 10 through the reader/writer 28 and the control circuit 26. On the other hand, if it is judged that a correct secret code data is inputted, the microprocessor 32 reads neccessary data from the region for other data to start required processing. Leaving a datailed description of the collation operation to a later section, it detects basically whether an erroneous secret code data was inputted through the keyboard 20 (an erroneous input). Here, if the frequency of successive erroneous inputs which took place by that time (the number of erroneous inputs in a row) is less than a prescribed value, it is judged as an erroneous input, whereas if it exceeds the prescribed balue, it is judged as an erroneous input of. In the case of an erroneous input, the terminal equipment permits input for a second time of a secret code, but in the case of an erroneous input, the terminal equipment issues a card discharge command to the card reader/writer 28 to discharge the card.

As in the above, there is installed in the memory unit 34 of the card, an erroneous input recording region for indicating the situation of erroneous inputs which took place in the past, in order to prevent an illicit use of the card. In a card according to the present invention, the recording is carried out in the following manner to reduce the number of memories required.

First, assuming that the unused bit of the erroneous recording region in the memory unit 34 is in a state of "1", a PROM or an EPROM is employed so as to make the return to a state of "1" for another time after it was changed once to a state of "0", either to be impossible at least by the use of the reader/writer 28 alone or to require a separate special writer. In such a case, a change from "1" to "0" requires ordinarily a special voltage for writing so that it also is desirable to supply the writing voltage from the reader/writer 28 to the memory unit 34 through the connection unit 30.

The erroneous input recording region in this embodiment includes of two parts of an upper memory 36 and a lower memory 38, as shown by FIG. 4, in which a "1" state of the erroneous input is represented by a pattern of two corresponding bits. The traces of the erroneous input up to now are represented, for example, by the two kinds of 2-bit patterns $$\begin{pmatrix} 0 \\ 0 \end{pmatrix} \text{ and } \begin{pmatrix} 0 \\ 1 \end{pmatrix},$$

whereas it is $$\begin{pmatrix} 1 \\ 1 \end{pmatrix}$$

for an unused portion. The used bit number is recorded so as not to exceed twice the cumulative frequency of erroneous inputs.

In the present embodiment, if the microprocessor 32 judges that a secret code data input is erroneous, a set of $$\begin{pmatrix} 1 \\ 1 \end{pmatrix}$$

which has so far remained as an unused bit is changed to an erroneous input pattern $$\begin{pmatrix} 0 \\ 1 \end{pmatrix}.$$

On the other hand, if the microporcessor 32 judges that the secret code data input is a correct one, an erroneous input pattern $$\begin{pmatrix} 0 \\ 1 \end{pmatrix}$$

in the erroneous input recording region is changed to another erroneous input pattern $$\begin{pmatrix} 0 \\ 0 \end{pmatrix}.$$

In FIG. 5 is shown a flow diagram for such a collation operation by the microprocessor 32. In step 100, the microprocessor 32 is waiting for the supply of a secret code data input from the keyboard 20 through the connection unit 30 and a secret code collation command. Upon receipt of a secret code collation command, the microprocessor 32 executes the routine for checking the successive erroneous inputs kept in the control ROM(steps 110 and 120). In this routine, determination is made first of the number P of the erroneous input $$\begin{pmatrix} 0 \\ 1 \end{pmatrix}$$

in which the upper and lower numbers of the erroneous input recording region are "0" and "1", respectively. The number P can be given by $P = A_2 - A_1$ in which $A_1$ represents the bit position where "1" appears for the first time in the upper memory 36 and $A_2$ represents the bit position where "1" appears for the first time in the lower memory 38. Here, if, by comparing the number P (which represents the number of times in which erroneous inputs were made in a row, up to the present time) with the prescribed number n, it is determined that $P \geq n$ holds, then it is judged as an erroneous input B, and the result of judgement is transmitted via the connection unit 30 to the terminal equipment 10 to complete the processing.

On the other hand, if $P < n$, the microprocessor 32 reads the secret code data which has been registered in advance in the secret code region of the memory unit 34 (step 130), and checks whether it coincides with the input secret code data which was supplied via the connection unit 30 and is being held there (step 140).

If a discrepancy between the input secret code and the registered secret code is found as a result of the collation, it is judged as an erroneous input A, and the microprocessor 32 executes the routine (step 150) for an erroneous input in the control ROM. The routine is for changing the unused bit $$\begin{pmatrix} 1 \\ 1 \end{pmatrix} \text{ to } \begin{pmatrix} 0 \\ 1 \end{pmatrix}$$

so that the microprocessor 32 needs, for example, only to write "0", by the required voltage, to the bit position A in the upper memory 36 which has been found previously. The microprocessor 32 notifies via the connection unit 30 the terminal equipment that the result of the judgment is an erroneous input A.

When an agreement betweeen the input secret code and the registered secret code is found in step 140, the microprocessor 32 executes the routine (step 160) for changing the erroneous input patterns in the control ROM. The routine is for changing all of the erroneous input pattern $$\begin{pmatrix} 0 \\ 1 \end{pmatrix}$$

in the erroneous input recording region to $$\begin{pmatrix} 0 \\ 0 \end{pmatrix}.$$

Here, the microprocessor 32 writes, for example, "0" for each bit in the bit positions $A_2, A_2+1, \ldots, A_1-1$ in the lower memory 38. Following the completion of the processing in the step 160 it then becomes ready to start desired exchange of information.

In the example of a recording state shown in FIG. 4, the frequency of successive erroneous inputs is $P=2$, and the cumulative frequency of erroneous inputs so far is 3 ($=A_1-1$). Therefore, it is of course easy to judge the cumulative frequency of erroneous inputs, though it was not executed in the embodiment described in the foregoing. In addition, the required number of memories can be reduced maskedly since it is not necessary to record a state in which the input secret code is correct to an unused bit.

In summary, it is possible by the system according to the present invention to memorize the cumulative frequency of erroneous inputs and the frequency of successive erroneous inputs up to the present time by the use of a lesser number of memories, since memory bits for memorizing successful operation subsequent to an erroneous input operation is not required.

Various modifications will become possible for those skilled in the art after receiving the teachings of the present disclosure without departing from the scope thereof.

What is claimed is:

1. An individual discrimination card with built-in CPU and memory which is constructed so as to memorize the erroneous inputs of a secret code data from an external equipment and render the card useless when the frequency of successive erroneous inputs of the secret code data exceeds a predetermined number, comprising:

memory means for memorizing the data which indicates the frequency of erroneous inputs of the secret code data, said erroneous input frequency data comprising a first data and a second data; and judging means for judging whether or not said secret code data is an erroneous input, and for letting said memory means to memorize a first data when the secret code data is an erroneous input and a to rewrite a first data in said memory means to a second data when the secret code data is a legitimate one.

2. An individual discrimination card as claimed in claim 1, further comprising:

a connection unit for receiving at least the secret code data from the external equipment and supplying it to said judging means.

3. An individual discrimination card as claimed in claim 2, in which said judging means rewrites all of the first data in said memory means to the second data when the secret code data is legitimate.

4. An individual discrimination card as claimed in claim 2, in which said judging means is constructed to, when the secret code data is an erroneous input, memorized the frequency data on erroneous inputs at a portion of said memory means that has not so far been used for memory, in such a manner that the bit number used for memory so far does not exceed twice the cumulative frequency of erroneous inputs.

5. An individual discrimination card as claimed in claim 2, in which the first and the second data on the frequency of erroneous inputs are represented by 2-bit patterns, where the first data is a pattern in which a bit in unused two bits is rewritten, while the second data is a pattern in which the bit in the first data, that has not been rewritten, is rewritten.

6. An individual discrimination card as claimed in claim 5, in which said memory means comprises a memory wherein it inpossible to rewrite a bit that was rewritten once for a second time.

7. An individual discrimination card as claimed in claim 6, in which the memory comprises at least a secret code region which is memorizing the secret code data that is proper to the user, a data region which is memorizing the data that is necessary for information exchange with the external equipment, and an erroneous input recording region which is memorizing an information of the erroneous inputs of the secret code data that have taken place in this card in the past.

8. An individual discrimination card as claimed in claim 2, in which
the judging means comprises a microprocessor.

9. An individual discrimination card as claimed in claim 2, in which
the external equipment comprises the main body of a terminal equipment consisting of microprocomputers, a color display, a printer, a floppy disk unit, a keyboard, a 2-channel communication control unit, and a card reader/writer, one part of the communication control unit being connected to a communication circuit via an on-line interface controller, while the other past being connected to the card reader/writer via an interface control circuit.

10. An individual discrimination card which is constructed so as to memorize the erroneous inputs of a secret code data from an external equipment and render the card useless when the frequency of successive erroneous inputs of the secret code data exceeds a predetermined number, comprising:
memory means for memorizing the data which indicates the frequency of erroneous inputs of the secret code data;
judging means for judging whether or not the secret code data is an erroneous input, as well as for detecting, when the secret code data is found to be an erroneous input, the frequency of successive erroneous inputs and the cumulative frequency of erroneous inputs, in such a manner that the data on the frequency of the erroneous inputs memorized in a portion of said memory means which has not been used for memory so far does not exceed twice the cumulative frequency of erroneous inputs.

11. An individual discrimination card as claimed in claim 10, in which
the data on the frequency of erroneous inputs includes of a first data and a second data, and said judging means judges whether or not the secret code data is an erroneous input, to memorize in said memory means a first data when the secret code data is an erroneous input, and a first data in said memory means to rewrite to a second data when the secret code data is a legitimate one.

12. An individual discrimination card as claimed in claim 11, further comprising:
a connection unit for receiving at least the secret code data from the external equipment and for supplying it to said judging means.

13. An individual discrimination card as claimed in claim 12, in which
said judging means rewrites all of the first data in said memory means to the second data when the secret code data is legitimate.

14. An individual discrimination card as claimed in claim 12, in which
said judging means lets, when the secret code data is an erroneous input, the frequency data on erroneous inputs to be memorized at a portion of the memory unit that has not been used for memory, in such a manner that the bit number used for memory so far does not exceed twice the cumulative frequency of erroneous inputs.

15. An individual discrimination card as claimed in claim 12, in whcih
the first and the second data on the frequency of erroneous inputs are represented by 2-bit patterns, where the first data is a pattern in which one of the two unused bits is rewritten, while the second data is a pattern in which the bit in the first data, that has not been rewritten, is rewritten.

16. An individual discrimination card as claimed in claim 15, in which
the memory means comprises a memory which makes it inpossible to rewrite a bit that was rewritten once for a second time.

17. An individual discrimination card as claimed in claim 16, in which
the memory comprises at least a secret code region which is memorizing the secret code data that is proper to the user, a data region which is memorizing the data that is necessary for information exchange with an external equipment, and an erroneous input recording region which is momorizing an information pertaining to the erroneous inputs of the secret code data that have taken place in this card in the past.

18. An individual discrimination card as claimed in claim 12, in which
said judging means comprises a microprocessor.

19. An individual discrimination card as claimed in claim 12, in which
the external equipment comprises the main body of a terminal equipment consisting of microcomputers, a color display, a printer, a floppy disk unit, a keyboard, a 2-channel communication control unit, and a card reader/writer, one part of the communication control unit being connected to a communication circuit via an on-line interface controller, while the other part being connected to the card reader/writer via an interface control circuit.

* * * * *